United States Patent
Wang et al.

(10) Patent No.: US 10,963,094 B2
(45) Date of Patent: Mar. 30, 2021

(54) TOUCH-AND-DISPLAY DEVICE AND SENSING SYSTEM

(71) Applicant: HIMAX TECHNOLOGIES LIMITED, Tainan (TW)

(72) Inventors: Hui-Min Wang, Tainan (TW); Ren-Hao Ye, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/662,009

(22) Filed: Oct. 23, 2019

(65) Prior Publication Data

US 2020/0401293 A1 Dec. 24, 2020

Related U.S. Application Data

(60) Provisional application No. 62/862,695, filed on Jun. 18, 2019.

(51) Int. Cl.
| | |
|---|---|
| *G06F 3/041* | (2006.01) |
| *G06F 3/044* | (2006.01) |
| *G02F 1/1333* | (2006.01) |
| *G02F 1/1335* | (2006.01) |
| *G06F 3/0354* | (2013.01) |

(52) U.S. Cl.
CPC ...... *G06F 3/04162* (2019.05); *G02F 1/13338* (2013.01); *G02F 1/133512* (2013.01); *G06F 3/03545* (2013.01); *G06F 3/0412* (2013.01); *G06F 3/0441* (2019.05); *G06F 3/0443* (2019.05)

(58) Field of Classification Search
CPC ... G06F 3/04162; G06F 3/0443; G06F 3/0412
USPC .................................................. 345/173, 174
See application file for complete search history.

(56) References Cited

U.S. PATENT DOCUMENTS

| | | | |
|---|---|---|---|
| 9,817,491 B2 | 11/2017 | Rebeschi et al. | |
| 2011/0050624 A1* | 3/2011 | Lee | G06F 3/045 |
| | | | 345/174 |
| 2016/0365367 A1* | 12/2016 | Kimura | H01L 27/1225 |
| 2017/0285771 A1* | 10/2017 | Jung | G06F 3/0412 |
| 2018/0113519 A1* | 4/2018 | Yamamoto | G06F 3/0442 |
| 2018/0113523 A1* | 4/2018 | Hara | G06F 3/044 |
| 2018/0277029 A1* | 9/2018 | Lee | G06F 3/0412 |
| 2018/0356908 A1* | 12/2018 | Koike | G06F 3/03545 |
| 2019/0095034 A1* | 3/2019 | Xu | G06F 3/04166 |

(Continued)

FOREIGN PATENT DOCUMENTS

| | | |
|---|---|---|
| CN | 107272921 A | 10/2017 |
| CN | 107977112 A | 5/2018 |

(Continued)

*Primary Examiner* — Prabodh M Dharia
(74) *Attorney, Agent, or Firm* — CKC & Partners Co., LLC

(57) ABSTRACT

A touch-and-display device operated with an active stylus is provided. The touch-and-display device includes a touch-and-display panel and a circuit. In a touch sensing period, the circuit transmits a touch sensing signal to multiple sensing electrodes and determines at least one touched electrode and at least one untouched electrode of the sensing electrodes based on capacitance of the sensing electrodes. In a stylus sensing period, the circuit transmits an uplink signal to the untouched electrodes and applies a direct current voltage to the touched electrodes. The uplink signal is a time-varying signal.

11 Claims, 5 Drawing Sheets

(56) References Cited

U.S. PATENT DOCUMENTS

| | | | | |
|---|---|---|---|---|
| 2019/0179475 A1* | 6/2019 | Seo | ................... | G06F 3/041661 |
| 2020/0004367 A1* | 1/2020 | Lee | ....................... | G06F 3/0416 |
| 2020/0210021 A1* | 7/2020 | Ju | ......................... | G06F 3/0442 |
| 2020/0401272 A1* | 12/2020 | Wang | ................... | G06F 3/0441 |

FOREIGN PATENT DOCUMENTS

| | | |
|---|---|---|
| CN | 109213359 A | 1/2019 |
| CN | 109582170 A | 4/2019 |
| TW | I609310 B | 12/2017 |

* cited by examiner

TOUCH-AND-DISPLAY DEVICE AND SENSING SYSTEM

RELATED APPLICATIONS

This application claims priority to U.S. Provisional Application Ser. No. 62/862,695, filed Jun. 18, 2019, which is herein incorporated by reference.

BACKGROUND

Field of Invention

The present invention relates to a touch-and-display device operated with an active stylus.

Description of Related Art

Recently, a stylus has been widely used as a human interface device (HID) for smart phones and tablets. The stylus can be classified as a passive stylus and an active stylus. In the operation of a general active stylus, a touch screen sends an uplink signal to the active stylus, and the active stylus transmits a downlink signal to the touch screen. However, the hand holding the active stylus may also touch the touch panel at the same time such that the uplink signal is also transmitted to a case of the active stylus through the hand, which affects the identification of the uplink signal by the active stylus.

SUMMARY

Embodiments of the present disclosure provide a touch-and-display device operated with an active stylus. The touch-and-display device includes a touch-and-display panel and a circuit. The touch-and-display panel includes multiple sensing electrodes, in which the sensing electrodes are electrically insulated with each other. The circuit is electrically connected to the sensing electrodes through multiple sensing lines. In a display period, the circuit applies a common voltage to the sensing electrodes through the sensing lines. In a touch sensing period, the circuit transmits a touch sensing signal to the sensing electrodes through the sensing lines, and determines at least one touched electrode and at least one untouched electrode of the sensing electrodes based on capacitance of the sensing electrodes. In a stylus sensing period, the circuit transmits an uplink signal to the at least one untouched electrode and applies a direct current voltage to the at least one touched electrode. The circuit also receives a downlink signal from the active stylus through the sensing electrodes, and determines a stylus location corresponding to the active stylus according to the downlink signal. The uplink signal is a time-varying signal.

In some embodiments, the touch-and-display panel further includes multiple pixel structures, multiple gate lines, and multiple data lines. Each of the gate lines is connected to corresponding ones of the pixel structures, and each of the data lines is connected to corresponding ones of the pixel structures. In the stylus sensing period, the circuit transmits the uplink signal to the gate lines and the data lines.

In some embodiments, the circuit is a touch and display driver integration (TDDI) circuit.

In some embodiments, the uplink signal is configured to carry synchronization information.

In some embodiments, the downlink signal is configured to carry pressure information, tilt information, or button information.

Embodiments of the present disclosure provide a sensing system including an active stylus and a touch-and-display device. The active stylus includes a case and a conductive tip. The touch-and-display device includes a touch-and-display panel and a circuit. The touch-and-display panel includes multiple sensing electrodes which are electrically insulated with each other. The circuit is electrically connected to the sensing electrodes through multiple sensing lines. In a display period, the circuit applies a common voltage to the sensing electrodes through the sensing lines. In a touch sensing period, the circuit transmits a touch sensing signal to the sensing electrodes through the sensing lines, and determines at least one touched electrode and at least one untouched electrode of the sensing electrodes based on capacitance of the sensing electrodes. In a stylus sensing period, the circuit transmits an uplink signal to the at least one untouched electrode and applies a direct current voltage to the at least one touched electrode. The circuit also receives a downlink signal from the active stylus through the sensing electrodes, and determines a stylus location corresponding to the active stylus according to the downlink signal. The uplink signal is a time-varying signal.

In some embodiments, the uplink signal is transmitted to the conductive tip through the at least one untouched electrode, and the direct current voltage is transmitted to the case through the at least one touched electrode. The active stylus further includes a signal processing circuit taking a voltage of the case as a ground voltage and analyzing a differential signal between the uplink signal from the conductive tip and the ground voltage.

In some embodiments, the signal processing circuit detects one of a period, a duty cycle, a number of pulses, a rising edge, and a falling edge of the uplink signal.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
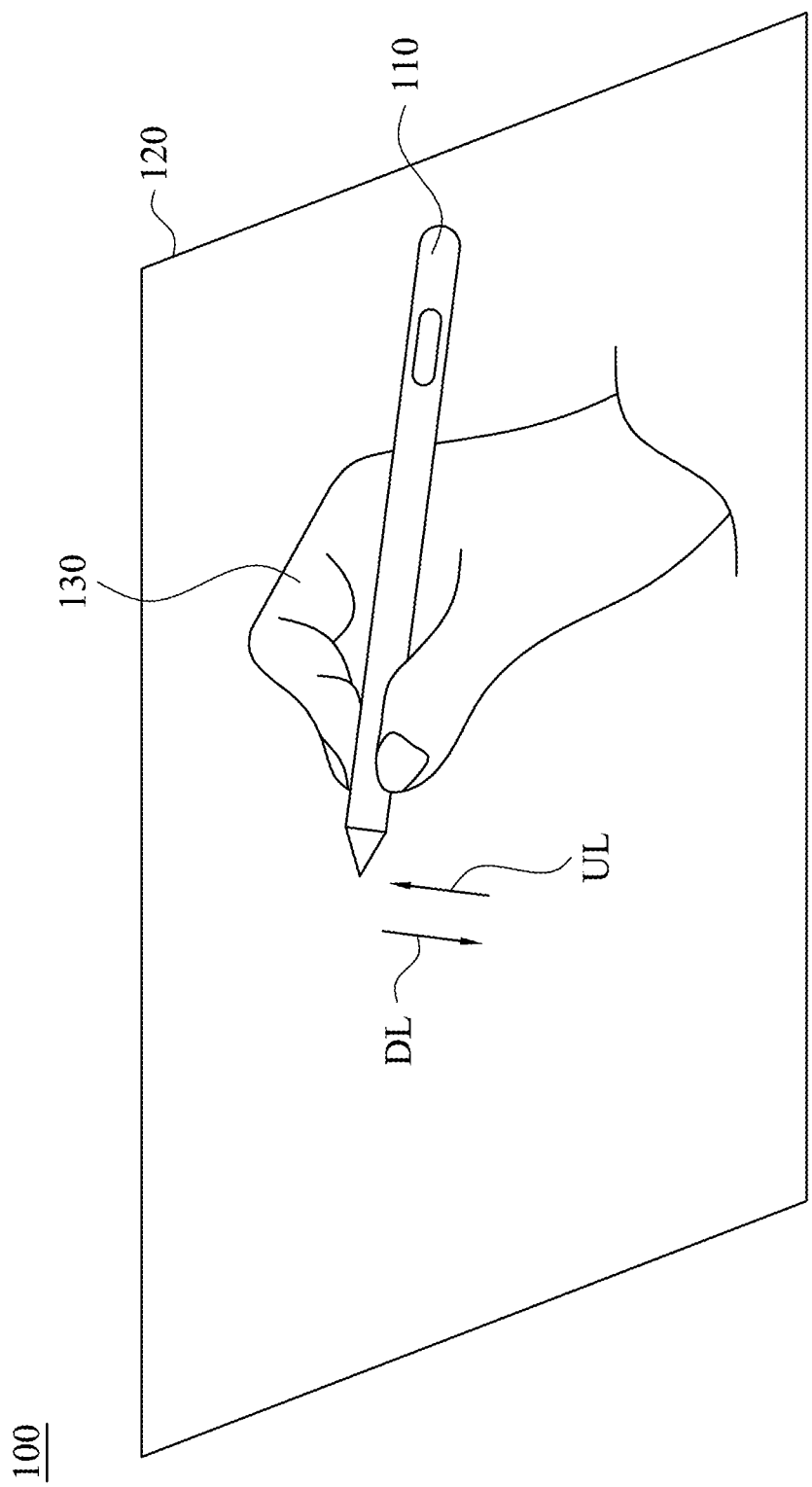
FIG. 1 is a schematic diagram of a sensing system in accordance with an embodiment.

FIG. 1 is a schematic diagram of a sensing system in accordance with an embodiment. Referring to FIG. 1, a sensing system 100 includes an active stylus 110 and a touch-and-display device 120. A user holds the active stylus 110 with his/her hand 130 to write or draw on the touchand-display device 120. The touch-and-display device 120 provides functions of display and touch sensing simultaneously to perform some operations in respond to the moving track of the active stylus 110. The active stylus 110 transmits a downlink signal DL to the touch-and-display device 120. The touch-and-display device 120 transmits an uplink signal UL to the active stylus 110. In conventional art, the uplink signal UL is emitted at all locations of the touch-and-display device 120. However, in the embodiment, the uplink signal UL is not emitted at the locations where the hand 130 touches on the touch-and-display device 120, and the uplink signal UL is emitted at the locations where the hand 130 does not touch. As a result, the uplink signal UL will not be transmitted to the case of the active stylus 110 through the hand 130, and therefore the identification of the uplink signal UL by the active stylus 110 will not be affected.

Figure 2:
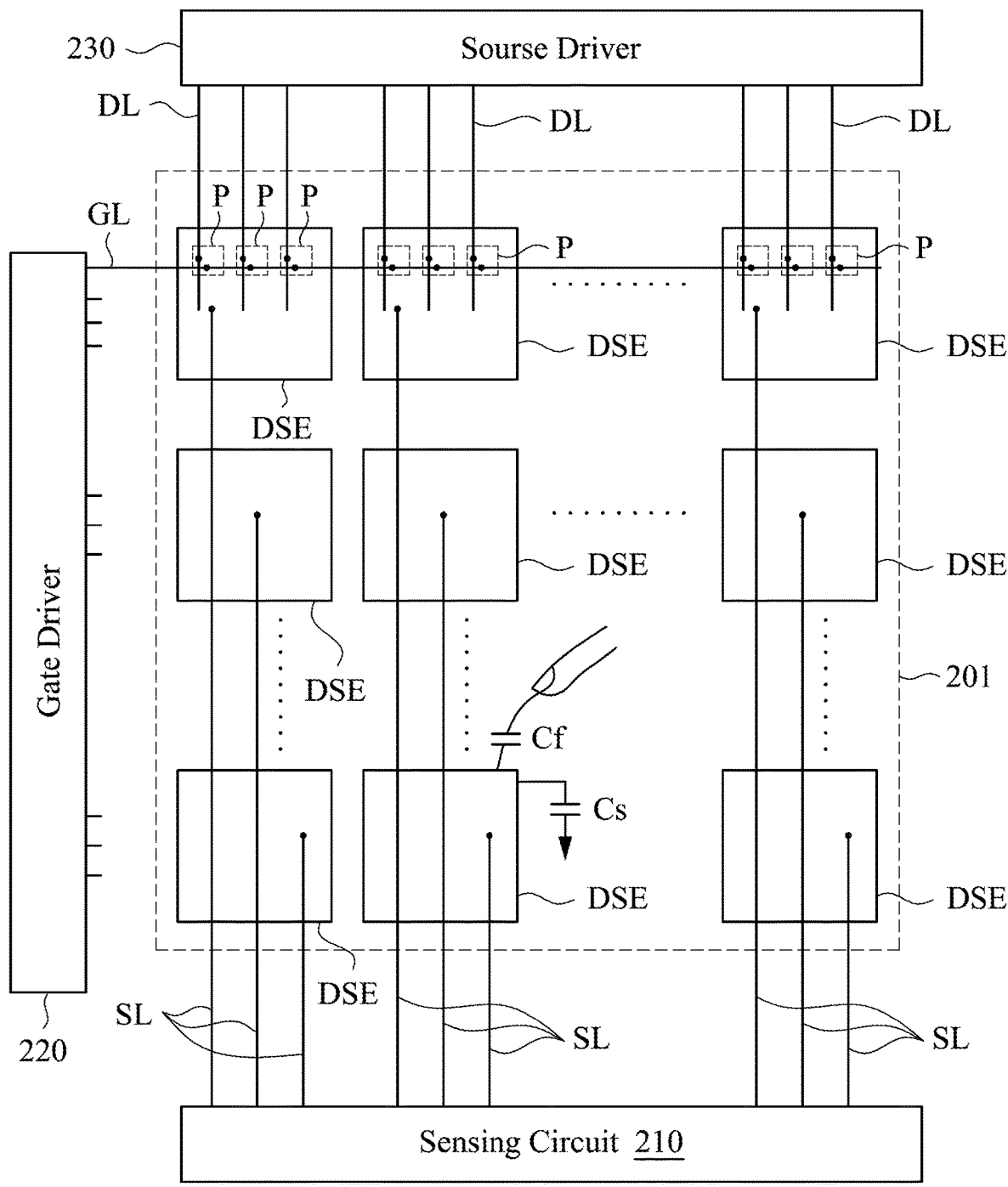
FIG. 2 is a schematic diagram of a touch-and-display device in accordance with an embodiment.

FIG. 2 is a schematic diagram of a touch-and-display device 120 in accordance with an embodiment. Referring to FIG. 2, the touch-and-display device 120 includes a touch and display driver integration (TDDI) circuit and a touch-and display panel 201. The touch-and display panel 201 includes sensing electrodes DSE and pixel structures P in a display area. The TDDI circuit includes a sensing circuit 210, a gate driver 220, and a source driver 230 in a non-display area. The touch-and-display device 120 also includes sensing lines SL, gate lines GL, and data lines DL. The sensing electrodes DSE are electrically insulated with each other and electrically connected to the sensing circuit 210 through the sensing lines SL respectively. Each sensing electrode DSE corresponds to multiple pixel structures P and serves as a common electrode of the corresponding pixel structure P. Each pixel structure P includes a thin film transistor (TFT) (not shown) and a pixel electrode (not shown). Each gate line GL is connected to the gate driver 220 and the gates of the TFTs of corresponding pixel structures P. Each data line DL is connected to the source driver 230 and the sources of the TFTs of corresponding pixel structures P. The drain of each TFT is connected to the corresponding pixel electrode. For simplification, not all circuits (e.g. time controller) are shown in FIG. 2, and the TDDI circuit may include other components.

In a display period, the gate driver 220 turns on the corresponding TFTs through the gate lines GL, and the source driver 230 transmits pixel data to the corresponding pixel electrodes through the data lines DL, and the sensing circuit 210 applies a common voltage to the sensing electrodes DSE through the sensing lines SL. A voltage difference between the pixel electrode and the sensing electrode DSE is configured to orient liquid crystal molecule to determine a brightness of a pixel. In other embodiments, the touch-and display panel 201 may be an organic light emitting diode (OLED) panel or any other suit display panel.

In a touch sensing period, it is determined whether each sensing electrode DSE is touched by a self-inductive capacitance sensing method. To be specific, a capacitor Cs is formed on each sensing electrode DSE (only one capacitor Cs is shown in FIG. 2 for simplification). When a finger (or passive stylus) touches a sensing electrode DSE, capacitor Cf is formed between the finger and the touched sensing electrode DSE such that the total capacitance of the touched sensing electrode DSE changes. The sensing circuit 210 transmits a touch sensing signal to the sensing electrodes DSE through the sensing lines SL, in which the quantity of the charges accumulated on the sensing electrodes DSE reflects the capacitance thereof, and thus the sensing circuit 210 can determine which sensing electrode DSE is touched based on the capacitance. For example, sensing circuit 210 includes a multiplexer, an integrator, and/or an analog to digital converter which is not limited in the invention. In addition, the touch sensing signal may have waveforms of square, triangle, sine or any suitable waveform, which is not limited in the invention.

Figure 3:
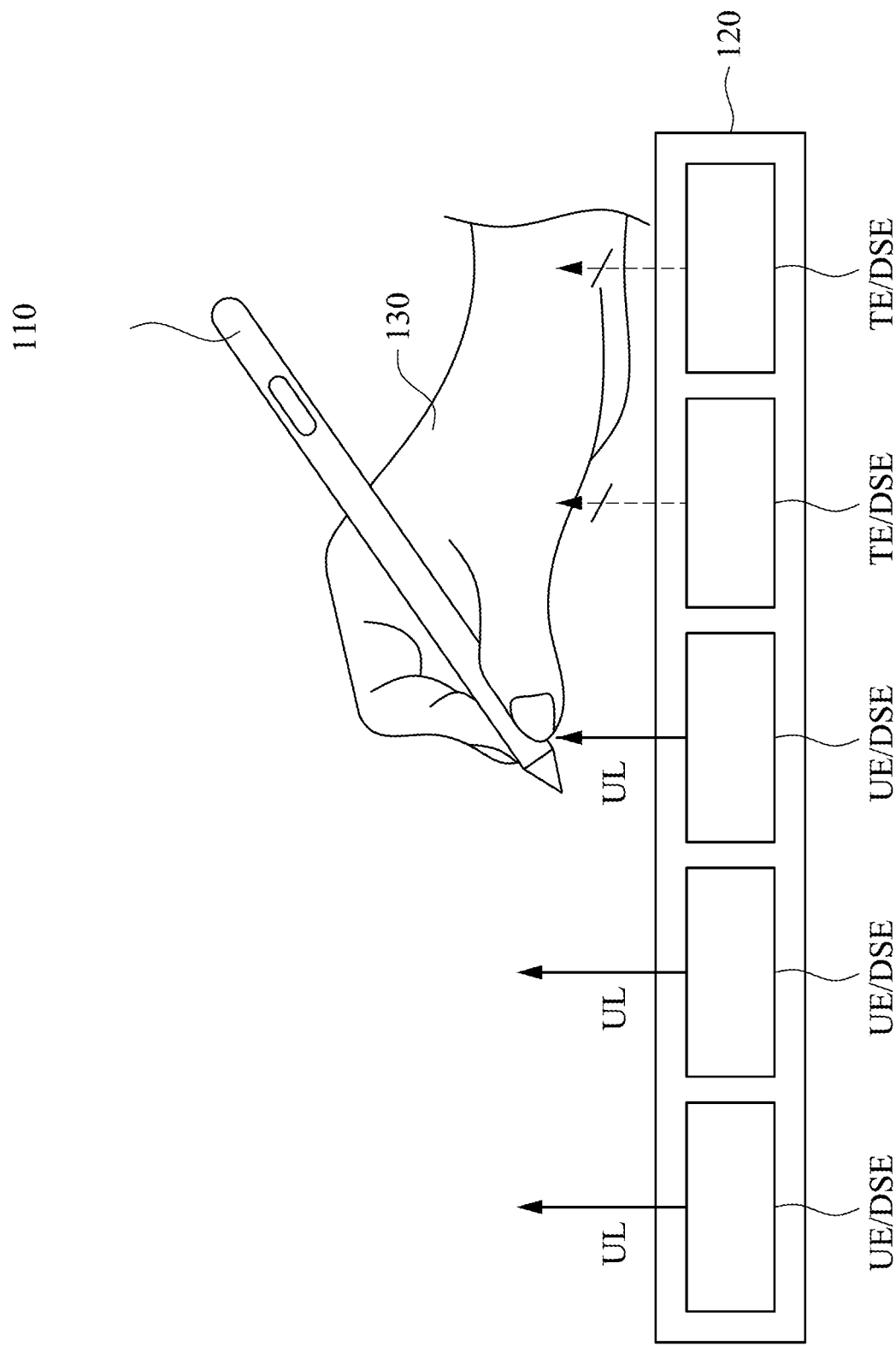
FIG. 3 is an operation schematic diagram of the sensing system in accordance with an embodiment.

FIG. 3 is an operation schematic diagram of the sensing system in accordance with an embodiment. Referring to FIG. 2 and FIG. 3, in the embodiment, the sensing electrode DSE touched by the hand is referred to touched electrode TE, and the sensing electrode DSE not touched by the hand is referred to untouched electrode UE. In a stylus sensing period, the sensing circuit 210 transmits the uplink signal UL to the untouched electrodes UE. In some embodiments, the gate driver 220 and the source driver 230 also transmits the uplink signal UL to the gate lines GL and the data lines DL respectively to enhance the uplink signal UL. In particular, the sensing circuit 210 applies a direct current (DC) voltage DC to the touched electrode TE. In other words, the uplink signal UL is not transmitted to the touched electrode TE, and thus will not be transmitted to the case of the active stylus 110 through the hand 130 of the user. Accordingly, the identification of the uplink signal UL by the active stylus 110 is not affected.

Figure 4:
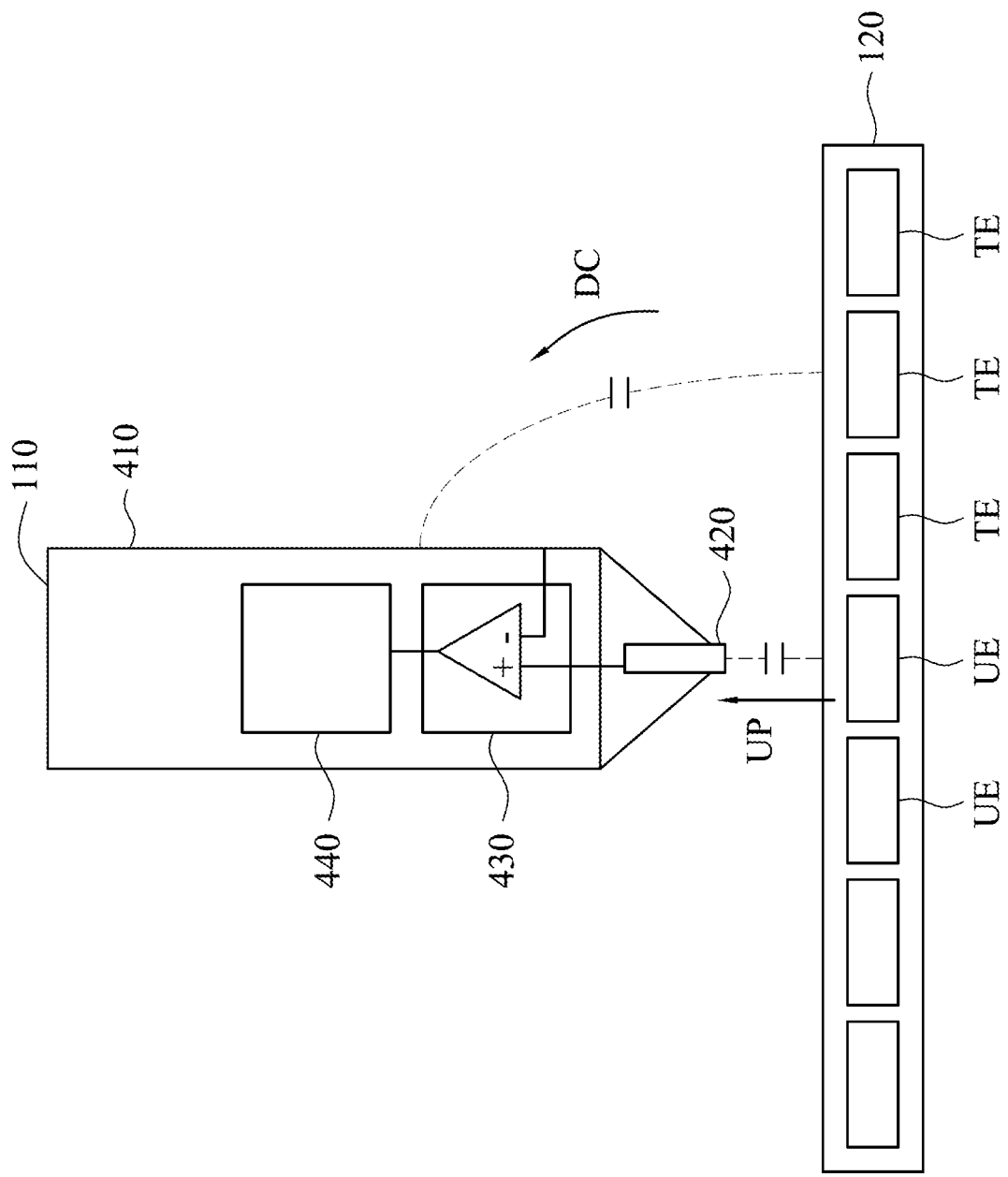
FIG. 4 is a schematic circuit diagram of the sensing system in accordance with an embodiment.

In more details, FIG. 4 is a schematic circuit diagram of the sensing system in accordance with an embodiment. Referring to FIG. 3 and FIG. 4, the active stylus 110 includes a case 410 and a conductive tip 420 which protrudes from the case 410. A signal processing circuit 430 and a control circuit 440 are disposed in the case 410. The signal processing circuit 430 is electrically connected to the conductive tip 420 and the case 410. The uplink signal UL is transmitted to the conductive tip 420 through the untouched electrodes UE. The signal processing circuit 430 receives the uplink signal UL through the conductive tip 420. The uplink signal UL is a time-varying signal, for example, including pulses. In addition, the signal processing circuit 430 takes the voltage of the case 410 as a ground voltage, and analyzes the uplink signal UL according to a differential signal between the uplink signal UL and the ground voltage. In the conventional art, the uplink signal UL is transmitted to the case 410 through the hand 130, and thus the amplitude of the voltage on the conductive tip 420 changes with the ground voltage, resulting in that the amplitude of the differential signal decreases, affecting the identification of the uplink signal UL. However, in the embodiment, since the DC voltage DC is transmitted to the case 410 through the touched electrode TE and the hand 130, and therefore the identification of the uplink signal UL is improved. In some embodiments, the DC voltage DC serves as the ground voltage relative to the uplink signal UL, but the potential level of the DC voltage DC is not limited in the invention. In the embodiment of the FIG. 4, the illustrated amplifier in the signal processing circuit 430 is merely schematic. The units disposed in the signal processing circuit 430 are not limited in the invention.

Figure 5:
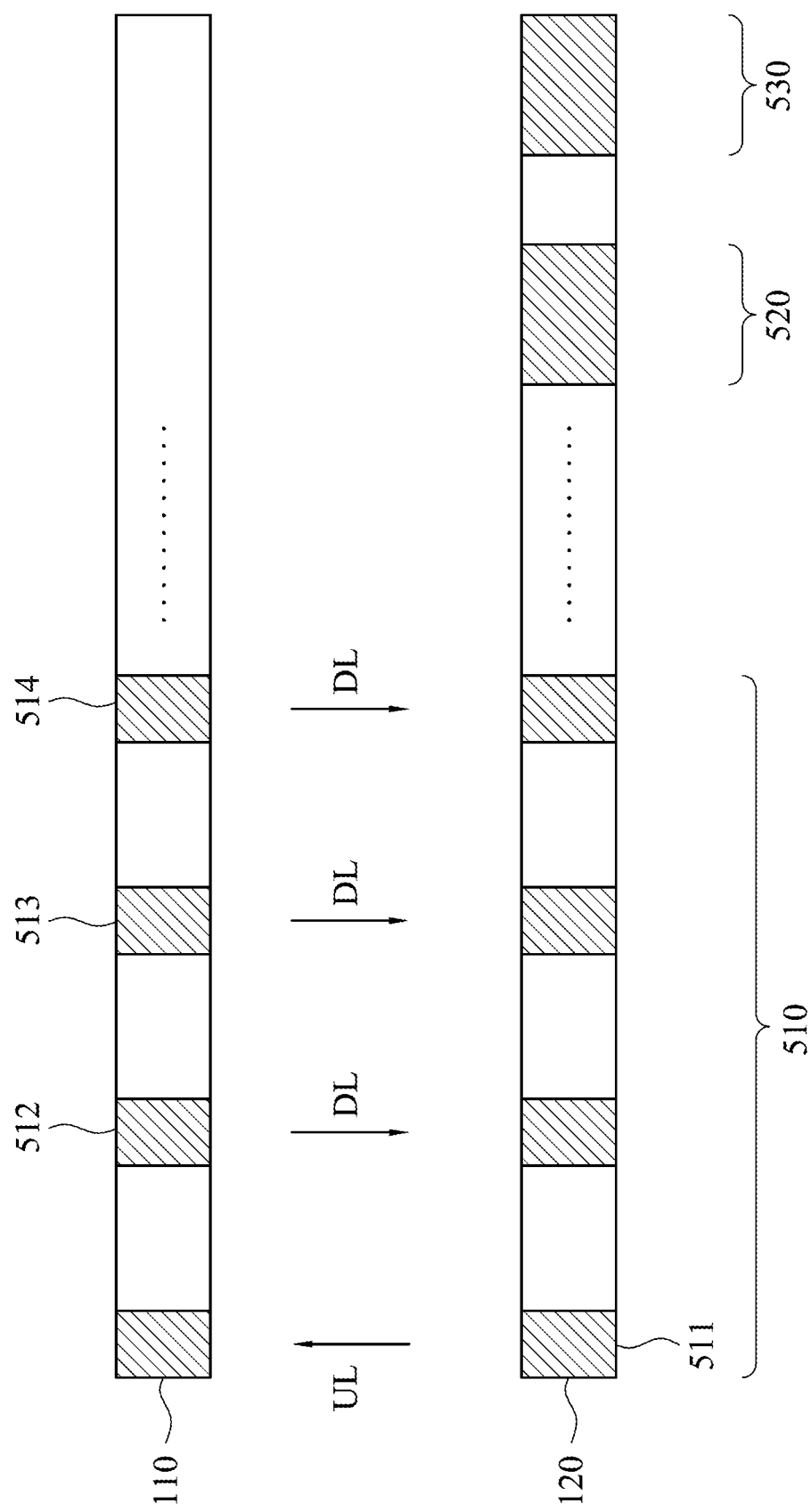
FIG. 5 is a schematic diagram of signals transmitted in each period in accordance with an embodiment.

FIG. 5 is a schematic diagram of signals transmitted in each period in accordance with an embodiment. The stylus sensing period 510 includes multiple slots. The touch-and-display device 120 transmits the uplink signal UL to the active stylus 110 in the slot 511. The active stylus 110 transmits the downlink signal DL to the touch-and-display device 120 in the slots 512-514. The downlink signal DL is transmitted to the sensing circuit 210 through the sensing electrodes DSE and the sensing lines SL. The sensing circuit 210 can determine a stylus location corresponding to the active stylus 110 according to the downlink signal DL. For example, the sensing circuit 210 includes a multiplexer and a demodulation circuit (not shown) in which the multiplexer is configured to connects the sensing electrodes DSE to the demodulation circuit sequentially so that the demodulation circuit can determine the stylus location according to the present and/or content of the downlink signal DL. In addition, the operations performed by the touch-and-display device 120 in the touch sensing period 520 and the display period 530 have been described in detail above, and therefore the description will not be repeated herein. In the embodiment of FIG. 5, the uplink signal UL transmitted in the slot 511 is based on the detection result of a previous touch sensing period (not shown), and the touch sensing period 520 is for determining the uplink signal UL in the next stylus sensing period (not shown). Note that the stylus sensing period 510, the touch sensing period 520, and display period 530 of FIG. 5 are not necessarily in the same frame period, the execution order of the these periods are not limited in the invention. For example, the touch sensing period 520 may be executed first, and then the stylus sensing period 510 is executed in some embodiments. In some embodiments, the touch sensing period 520 and the stylus sensing period 510 may be combined.

In some embodiments, the downlink signal DL is configured to carry pressure information, tilt information, or button information in addition to determine the stylus location. For example, the active stylus 110 includes a pressure sensor, an inertial sensor and a button. The pressure information indicates the pressure of the active stylus 110 pressed on the touch-and-display device 120. The tile information indicates the tile angle of the active stylus 110. The button information indicates if the button of the active stylus 110 is pressed. In some embodiments, the uplink signal UL have pulses, and the signal processing circuit of the active stylus 110 can detect the period, duty cycle, number of pulses, rising edge, or falling edge of the pulses to obtain the information carried by the uplink signal UL. In some embodiments, the uplink signal is configured to carry synchronization information (e.g. by the raising edge or the falling edge), and thus the active stylus 110 can transmits the downlink signal DL synchronized with the raising edge or the falling edge of the uplink signal. The uplink signal UL and/or the downlink signal DL can be configured to carry any information by a modulation technology such as direct-sequence spread spectrum (DSSS), frequency-hopping spread spectrum (FHSS), TH-time hopping (THSS), phase-shift keying (PSK), pulse-amplitude modulation (PAM), quadrature amplitude modulation (QAM), single-sideband modulation (SSB), but the technology of the modulation and the content of the carried information are not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch-and-display device operated with an active stylus comprising a case, a conductive tip, and a signal processing circuit taking a voltage of the case as a ground voltage and analyzing a differential signal between an uplink signal from the conductive tip and the ground voltage, the touch-and-display device comprising:
a touch-and-display panel, comprising a plurality of sensing electrodes, wherein the sensing electrodes are electrically insulated with each other; and
a circuit, electrically connected to the sensing electrodes through a plurality of sensing lines,
wherein in a display period, the circuit applies a common voltage to the sensing electrodes through the sensing lines,
wherein in a touch sensing period, the circuit transmits a touch sensing signal to the sensing electrodes through the sensing lines, and determines at least one touched electrode and at least one untouched electrode of the sensing electrodes based on capacitance of the sensing electrodes,
wherein in a stylus sensing period, the circuit transmits the uplink signal only to the at least one untouched electrode and applies a direct current voltage only to the at least one touched electrode, wherein the uplink signal is configured to be transmitted to the conductive tip through the at least one untouched electrode, and the direct current voltage is transmitted to the case through the at least one touched electrode, and the circuit receives a downlink signal from the active stylus through the sensing electrodes, and determines a stylus location corresponding to the active stylus according to the downlink signal, wherein the uplink signal is a time-varying signal.

2. The touch-and-display device of claim 1, wherein the touch-and-display panel further comprises a plurality of pixel structures, a plurality of gate lines, and a plurality of data lines, and each of the gate lines is connected to corresponding ones of the pixel structures, and each of the data lines is connected to corresponding ones of the pixel structures,
wherein in the stylus sensing period, the circuit transmits the uplink signal to the gate lines and the data lines.

3. The touch-and-display device of claim 2, wherein the circuit is a touch and display driver integration (TDDI) circuit.

4. The touch-and-display device of claim 1, wherein the uplink signal is configured to carry synchronization information.

5. The touch-and-display device of claim 1, wherein the downlink signal is configured to carry pressure information, tilt information, or button information.

6. A sensing system comprising:
an active stylus, comprising a case and a conductive tip; and
a touch-and-display device, comprising a touch-and-display panel and a circuit, wherein the touch-and-display panel comprises a plurality of sensing electrodes which are electrically insulated with each other, and the circuit is electrically connected to the sensing electrodes through a plurality of sensing lines,
wherein in a display period, the circuit applies a common voltage to the sensing electrodes through the sensing lines,
wherein in a touch sensing period, the circuit transmits a touch sensing signal to the sensing electrodes through the sensing lines, and determines at least one touched electrode and at least one untouched electrode of the sensing electrodes based on capacitance of the sensing electrodes,
wherein in a stylus sensing period, the circuit transmits an uplink signal only to the at least one untouched electrode and applies a direct current voltage only to the at least one touched electrode, and the circuit receives a downlink signal from the active stylus through the sensing electrodes, and determines a stylus location corresponding to the active stylus according to the downlink signal, wherein the uplink signal is a time-varying signal, wherein the uplink signal is configured to be transmitted to the conductive tip through the at least one untouched electrode, and the direct current voltage is configured to be transmitted to the case through the at least one touched electrode, wherein the active stylus further comprises a signal processing circuit taking a voltage of the case as a ground voltage and analyzing a differential signal between the uplink signal from the conductive tip and the ground voltage.

7. The sensing system of claim 6, wherein the touch-and-display panel further comprises a plurality of pixel structures, a plurality of gate lines, and a plurality of data lines, and each of the gate lines is connected to corresponding ones of the pixel structures, and each of the data lines is connected to corresponding ones of the pixel structures, wherein in the stylus sensing period, the circuit transmits the uplink signal to the gate lines and the data lines.

8. The sensing system of claim 7, wherein the circuit is a touch and display driver integration (TDDI) circuit.

9. The sensing system of claim 6, wherein the downlink signal is configured to carry pressure information, tilt information, or button information.

10. The sensing system of claim 6, wherein the signal processing circuit detects one of a period, a duty cycle, a number of pulses, a rising edge, and a falling edge of the uplink signal.

11. The sensing system of claim 10, wherein the uplink signal is configured to carry synchronization information.

* * * * *